US006331998B1

(12) United States Patent
Lin et al.

(10) Patent No.: US 6,331,998 B1
(45) Date of Patent: Dec. 18, 2001

(54) PARTIALLY MATCHED FILTER FOR SPREAD SPECTRUM COMMUNICATION

(75) Inventors: Wen-Chang Lin, Hsinchu; Yu T. Su, Chi-Yi, both of (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/143,180

(22) Filed: Aug. 28, 1998

(51) Int. Cl.[7] ................................................ H04B 15/00
(52) U.S. Cl. .......................... 375/143; 375/149; 375/150; 375/152; 370/324; 370/329
(58) Field of Search .................................. 375/130, 142, 375/143, 145, 147, 149, 150, 152, 367; 370/320, 324, 335, 342, 329, 330, 515; 708/314

(56) References Cited

U.S. PATENT DOCUMENTS

| | | | | |
|---|---|---|---|---|
| 5,440,597 | * | 8/1995 | Chung et al. | 375/200 |
| 5,666,352 | * | 9/1997 | Ohgoshi et al. | 370/206 |
| 5,712,869 | * | 1/1998 | Lee et al. | 375/206 |
| 5,991,332 | * | 11/1999 | Lomp et al. | 375/206 |
| 6,104,748 | * | 8/2000 | Kaku | 375/200 |
| 6,141,372 | * | 10/2000 | Chalmers | 375/147 |

* cited by examiner

Primary Examiner—Stephen Chin
Assistant Examiner—Dac V. Ha
(74) Attorney, Agent, or Firm—Proskauer Rose, LLP

(57) ABSTRACT

A method of acquiring a transmitted pseudo noise (PN) code c(t) from a received signal r(t) that is data modulated. The method includes, for a BPSK modulated signal, multiplying the received signal r(t) by $\cos(\omega_0 t)$ and $\sin(\omega_0 t)$, respectively to produce in-phase and quadrature (I-Q) down converted signals. Then multiplying the I-Q down converted signals by the PN code c(t), having a second PN code phase, to produce f(t) and g(t) respectively. Thereafter, summing separate contiguous portions of f(t) and g(t) and multiplying the summed portions of f(t) and g(t) by a matrix. The matrix represents data patterns within an interval $MT_c$ that spans the separate contiguous portions of f(t) and g(t). Lastly, the results of the matrix multiplication are compared to a threshold value to determine if the first PN code phase is equal to the second PN code phase.

10 Claims, 6 Drawing Sheets

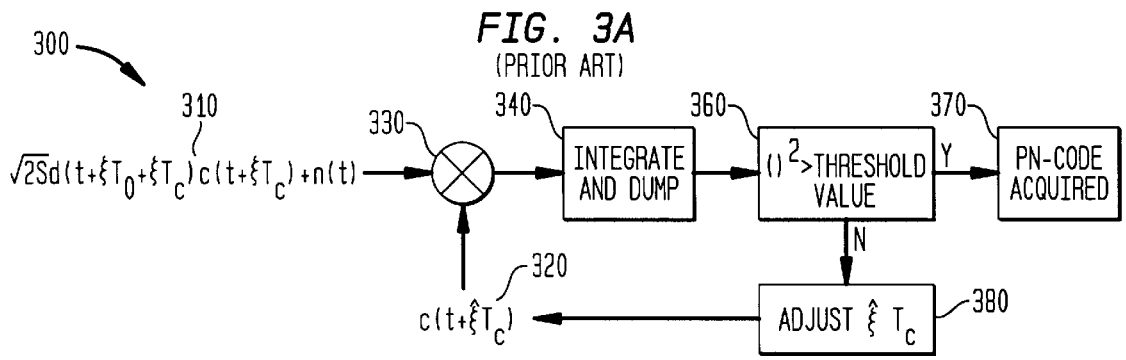
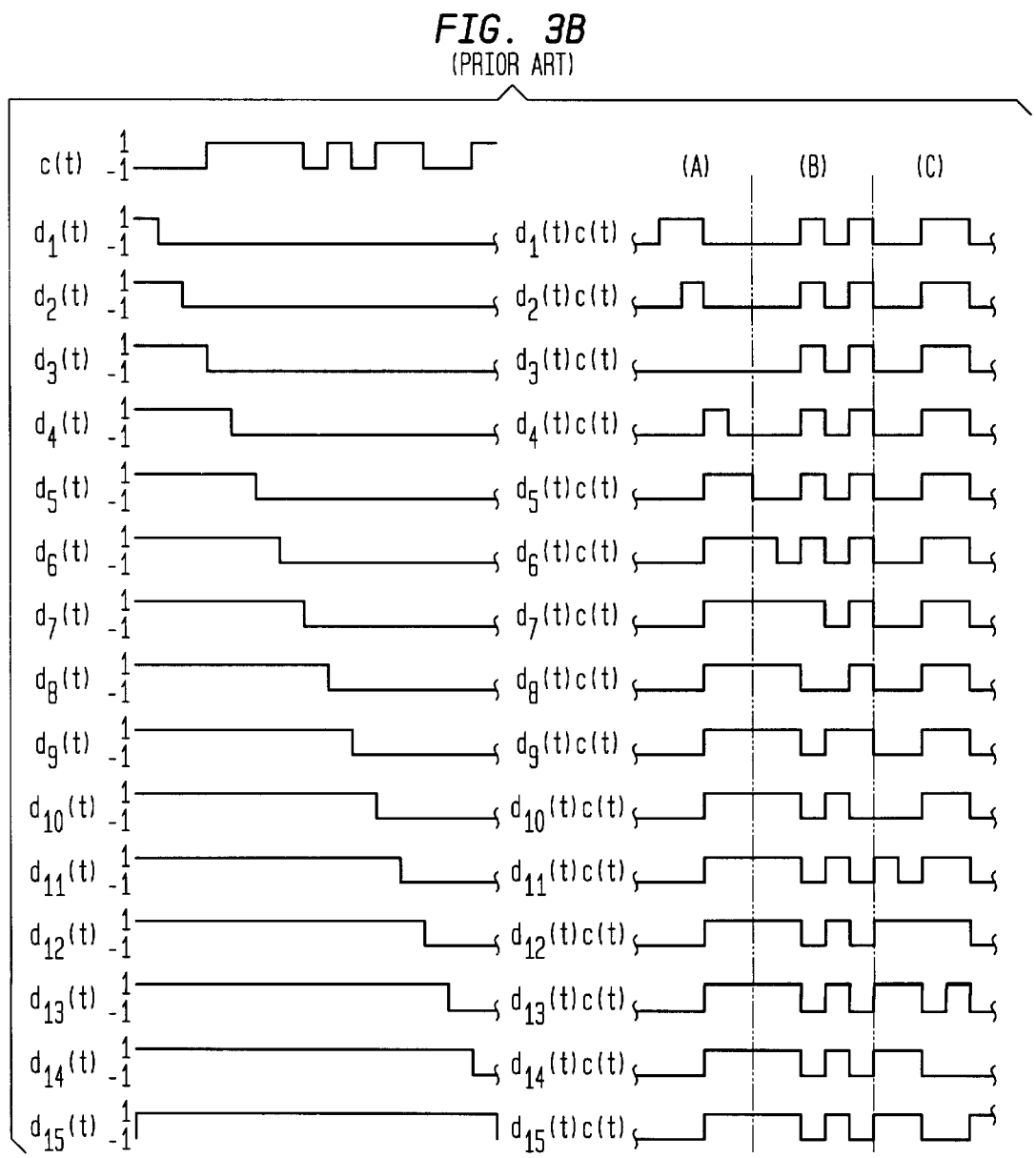

PARTIALLY MATCHED FILTER FOR SPREAD SPECTRUM COMMUNICATION

FIELD OF THE INVENTION

The present invention relates to despreading a transmitted direct sequence spread spectrum (DSSS) signal and particularly relates to despreading a transmitted spread spectrum (SS) signal that is data modulated.

BACKGROUND OF THE INVENTION

Radio frequency (RF) communication links are known for providing connectivity in point-to-point (e.g., walkie talkies) and point-to-multipoint (e.g., television transmission signals) applications. Typically, these applications have used a high power narrow band width transmission to ensure receipt of a data signal. The bandwidth of a typical RF transmission is allocated based on the complexity of the data signal. These systems are designed to concentrate energy close to a center frequency, which results in an increased transmission range. In this way, noise in a transmission environment, such as signal noise due to other RF transmitters, is overcome by tuning a receiver to the frequency of the desired signal. At this frequency, the power of the data signal is maximized and is more likely to be distinguished from background noise.

A DSSS transmission is a form of an RF transmission which differs from the typical RF transmission discussed above. With a DSSS transmission, instead of concentrating a high power transmission within a narrow bandwidth, a relatively low power transmission is spread out over a bandwidth much wider than is required to send the signal.

A DSSS system includes on the transmitting side, spreading the data signal, modulating the spreaded data, and up converting of the transmitted signal frequency to produce a DSSS signal. On the receiver side, the DSSS signal is down converted, demodulated, and despread to recover the data.

In operation, a data signal is "spread" over a wide bandwidth and then transmitted. In some cases, background transmission noise may have a higher peak power than the spread signal transmission. Yet, since the noise typically has a narrow bandwidth, only a small portion of the DSSS signal transmission may be obscured. Consequently, the SS signal can be reliably reconstructed at the receiver.

At the receiver, a received DSSS signal is collapsed ("despread") by removing the effect of the spreading. In this way, the signal may be regenerated. Despreading a DSSS signal requires knowledge of the spreading technique utilized at the transmitter since the same spreading technique must be utilized to despread the DSSS signal. It is for this reason that a DSSS signal is difficult to intercept or jam since to effectively do either, requires specific knowledge of the spreading technique utilized.

There are numerous ways to spread a signal. Typically, the spreading technique is selected to be independent of the signal. In DSSS, the data signal is combined with a pseudo noise binary bit stream ("PN code"). The PN code is utilized to modulate the carrier of the data signal. Typically, the PN code is synchronous with the data signal but has a much faster bit rate. By combining the data signal and the PN code, a spread data signal is produced.

The PN code is selected to appear random having approximately an equal number of 0's and 1's or −1's and 1's. The clock period of the PN code is called the chip time of the PN code and each PN code bit is called a chip.

In the following described figures, like reference numbers are utilized to describe functional blocks that perform the same or similar functions.

FIG. 1 shows a direct sequence transmitter wherein a binary adder 110 combines a PN code 125 from a PN code generator 120 with a data signal 100 to produce a spread data signal 115. The spread data signal 115 is modulated to a carrier frequency through the use of a modulator 130. The modulated signal is then in-phase, quadrature (I-Q) channel frequency up converted by an up converter 140 to produce a DSSS signal suitable for transmission.

FIG. 2 illustrates the operation of the binary adder 110 shown in FIG. 1. As shown, the data signal 100 is combined with the PN code 125 to produce the spread data signal 115. The modulation technique shown is a binary phase shift key (BPSK) technique wherein the data signal is modulated such that a change in phase of 180° corresponds to a 0 or 1 binary state. As shown, combining the data signal with the PN code results in the PN code being either unchanged for a data bit of 1, or inverted for data bit of 0. In a similar modulation technique, the opposite approach may be utilized wherein the PN code is inverted for a data bit of 1, and left unchanged for a data bit of 0. This modulation process is called bit-inversion modulation.

For a transmitter wherein BPSK is the modulation scheme, the signal observed at the receiver through an additive white Gaussian noise (AWGN) channel is:

$$r(t)=\sqrt{2S}d(t+\xi T_0+\zeta T_c)c(t+\zeta T_c)*\cos(\omega_0 t+\theta)+n(t) \qquad (1)$$

where:
  S is the signal power,
  $T_c$ is the chip time of the pseudo noise (PN) code,
  $T_0$ is the data bit time, which is assumed to be a multiple of $T_c$,
  c(t) is the PN code waveform,
  d(t) is the data signal,
  $\omega_0$ and $\theta$ are the carrier frequency and waveform phase,
  $\zeta T_c$ is the received PN code phase,
  $\xi T_0$ is the received data-bit-phase offset (assuming that the data stream timing is synchronous to the received chip time,
  n(t) is an AWGN component (e.g., background noise) with one sided power spectral density $N_0$.

In equation (1), AWGN is assumed for ease of discussion. The multiplication of c(t) with d(t) is the spreading of the data signal. In the receiver, the received signal is I-Q phase down converted. A coherent receiver (e.g., a receiver synchronized to the SS signal) will remove $\cos(\omega_0 t+\theta)$ during the demodulation process. Thereafter, the demodulated signal is multiplied by the PN code c(t) to despread the data d(t).

The problem with despreading a received signal is that the PN code receiver must be synchronized with the PN code utilized by the transmitter. In other words, the receiver has to acquire the transmitted PN code. Yet, due to the effect of the data signal d(t) at any given time, the demodulated signal may represent the PN code or the inverted PN code, as shown in FIG. 2. Correlation between the transmitted PN code and the PN code at the receiver is essential for recovering the data signal. A typical circuit used to recover a data signal is a correlator.

FIG. 3A shows a correlator 300 in which a demodulated signal 310 is combined with a PN code wave form signal 320 having an estimated PN code phase. The combined signal is received by an integrate and dump function 340 discussed in more detail below.

To exclude the effect of the data signal d(t) when the correlator is acquiring the PN code, many communication systems have a pilot channel (e.g., a channel separate from the spread data signal) with the data signal d(t) all equal to 1 or −1. In this way, the effects of the data signal on the PN code is known and therefore may be negated for purposes of acquiring the PN code.

The receiver PN code clock can be synchronized to the transmitted PN code transitions. This process though does not ensure that the transmitted PN code is acquired since the phase of the receiver PN code may still differ from the phase of the transmitted PN code. Yet, since the PN code has approximately an equal number of −1's and 1's (see discussion above), multiplying a transmitted PN code by a synchronous, but out-of-phase, receiver PN code results in a small output signal. In other words, the signals are destructively combined. When the transmitted PN code and receiver PN code are in-phase, the signals are constructively combined.

Specifically, the PN code has the property:

$$R(\tau) = \int_0^{MT_c} c(t)c(t+\tau)\,dt \begin{cases} \approx 0, & |\tau| > T_c \\ = \left(1 - \frac{|\tau|}{T_c}\right)MT_c, & |\tau| \le T_c \end{cases} \quad (2)$$

where M is selected to integrate over multiple chips of the PN code, and is preferably an integer greater than 10. When the transmitted PN code and the receiver PN code are in phase, i.e, $\tau=0$, we have approximately $MT_c$ or $-MT_c$ at the output of the integrate and dump 340, as contributed by the PN code. However, since there is an AWGN component n(t) to the received signal (see equation 1), and not necessarily an equal number of −1's and 1's to the PN code, an out-of-phase receiver PN code may not result in a combined signal equal to 0.

To account for the possibility of a non-zero result due to noise, the result from the integrate and dump 340 is received by a comparator 360 which squares the result (to remove the sign of the result) and compares the squared result to a threshold value. In a case where the squared result is greater than the threshold value, block 370 determines that the PN code is acquired.

Thereafter, the acquired PN code may be used to despread a received signal containing actual data (e.g., other than all 1's or −1's as discussed above). In a case where the squared value is less than the threshold value, the comparator 360 transmits a signal to a block 380 that adjusts the estimated PN code phase. The PN code with the adjusted PN code phase is then received by the multiplier 330 and the above described process is repeated by the correlator 300 until the PN code is acquired.

In the presence of data d(t), the output of the integrate and dump 340 may equal zero even when the receiver PN code is synchronized with the transmitted PN code. Yet, there are times when the acquisition of c(t) may be desirably performed with d(t) present. For example, re-acquisition of the PN code may be needed when synchronization is lost due to fading noise. In other systems a pilot channel may be unavailable or not implemented.

A traditional way to acquire a transmitted PN code wherein the received signal is data modulated is by a non-coherent combining method. The conventional spread spectrum acquisition system may use a structure as shown in FIG. 3. For an example of spread spectrum acquisition in the presence of data modulation, let us assume M, the code length, equals fifteen.

FIG. 3B depicts a PN code c(t) with a length of fifteen. When $d(t+\xi T_0+\zeta T_c)$ of FIG. 3A equals $d_{15}(t)$ as shown in FIG. 3B and the receiver PN code is synchronized with the transmitted PN code (e.g., $\zeta=\zeta^{\wedge}$), the result of squaring by comparator 360 has the value of $(\sqrt{(2s)}\times 15)^2 = 450s$. Accordingly, synchronization of the transmitted PN code by the receiver correlator results in a large value at the output of comparator 360.

When there is data present in the process of PN code acquisistion, the receiver may "see" a possible input sequence $d_i(t)c(t)$, for i=1,2, . . . ,15 in the integrate and dump period (see block 340). These possible input sequences $d_i(t)c(t)$, for i=1,2, . . . ,15 as in FIG. 3A occur when the data bit time $T_0 \ge MT_c$, the PN code period. In a case wherein $T_0 < MT_c$, then there may be two or more possible data transitions of $d_i(t)$ in the integrate and dump period.

A problem of data modulation arises when the received signal is, for instance, $\sqrt{(2s)}d_7(t)c(t)$ or $\sqrt{(2s)}d_8(t)c(t)$ and the PN code of the correlator in the receiver is c(t). In this case, the result of the squaring by the comparator 360 is $(\pm\sqrt{(2s)})_2 = 2s$. In this case, due to the small result from the comparator 360, synchronization of the PN code is not always detected when data is present in the conventional acquisition scheme.

A prior art method of PN code acquisition in the presence of data modulation is described in an article entitled, "Performance of a class of Parallel Spread-Spectrum Code Acquisition Schemes in the Presence of Data Modulation" by Cheng, from IEEE Transistor Communications, vol. 36, No. 5, pages 596–604, May 1988 (the Cheng article), incorporated herein by reference.

FIG. 3C shows the structure of a correlator circuit 300C as described in the Cheng article. In comparing FIGS. 3A and 3C, it is clear that the original integrate interval is changed from $MT_c$, in the integrate and dump 340 of FIG. 3A, to $MT_c/J$ in the integrate and dump 340C of FIG. 3C. Thereafter, in FIG. 3C, the integration value of the subintervals $MT_c/J$ are squared by squaring block 360C. Thereafter, J consecutive square values (e.g., three consecutive squares) are summed by summing block 361. The summed value is then utilized by a threshold comparison block 362 to determine if the PN code is acquired. When the summed value is greater than a threshold value, the PN code is determined as acquired by block 370. When the summed value is less than or equal to the threshold value, the phase of the estimated PN code phase is adjusted by block 380 and the above process is repeated until the PN code is acquired.

In the correlator circuit 300C, J is a parameter that is optimized through simulations. It is found that with Q possible data transitions in the integration interval $MT_c$, the optimized $J \approx (2Q+1)$. Therefore, a possible data transition in $MT_c$ results in J=3. The dashed lines in FIG. 3B specify the integration interval utilizing Cheng's method. Following, this method is applied to the example of data modulation presented above, for a case wherein the input signal is $\sqrt{(2s)}d_7(t)c(t)$ and the PN code of the correlator is c(t). The output of the squaring block 360C for the first integration subinterval results in:

$$\sqrt{2s}[(-1)(-1)+(-1)(-1)+(-1)(-1)+(1)(1)+(1)(1)] = 5\sqrt{2s}.$$

The output of the squaring block 360C for the second integration subinterval results in:

$$\sqrt{2s}[(1)(1)+(1)(1)+(1)(-1)+(-1)(1)+(1)(-1)] = -\sqrt{2s}.$$

The output of the squaring block 360C for the third integration subinterval results in:

$$\sqrt{2s}[(-1)(1)+(-1)(1)+(1)(-1)+(1)(-1)+(-1)(1)] = -5\sqrt{2s}.$$

The sum of the three consecutive squares from the summing block 361 equals 102s. This value is less than the 450s as in the conventional acquisition correlator circuit 300 shown in FIG. 3A without data modulation. Yet, is greater than 2s as achieved above for the correlator 300 in FIG. 3A in the presence of data modulation. Accordingly, PN code acquisition is improved in the correlator 300C in FIG. 3C over the correlator 300 in FIG. 3A.

However, it is an object of the present invention to provide a correlator system that performs better than the prior art correlators and can acquire a transmitted PN code phase when a modulating data signal is present.

SUMMARY OF THE INVENTION

These and other objects of the present invention are achieved by a correlator in accordance with the present invention. The present invention provides a method of acquiring a transmitted pseudo noise (PN) code c(t) having a first PN code phase from a received signal r(t) that is data modulated. The method includes the steps of:

(a) multiplying the received signal r(t) by $\cos(\omega_0 t)$ and $\sin(\omega_0 t)$, respectively to produce in-phase and quadrature (I-Q) down converted signals (for BPSK modulated signals);

(b) multiplying the I-Q down converted signals by the PN code c(t) having a second PN code phase to produce f(t) and g(t) respectively;

(e) summing separate contiguous portions of f(t) and g(t);

(f) multiplying the summed portions of f(t) and g(t) by a matrix wherein the matrix represents data patterns within an interval $MT_c$ that spans the separate contiguous portions of f(t) and g(t); and (g) comparing the results of the matrix multiplication to a threshold value to determine if the first PN code phase is equal to the second PN code phase.

BRIEF DESCRIPTION OF THE DRAWINGS

The following is a description of an embodiment of the present invention that when taken in conjunction with the following drawings will demonstrate the above-noted features and advantages as well as further ones. It should be expressly understood that the drawings are included for illustrative purposes and do not represent the scope of the present invention. The invention is best understood in conjunction with the accompanying drawings in which:

FIG. 3A is a block diagram of a prior art correlator circuit;

FIG. 3B is a second waveform diagram illustrating the effects of modulating a data signal $d_i(t)$, for i=1,2, . . . ,15 with a PN code c(t);

DETAILED DESCRIPTION OF THE INVENTION

Figure 4:
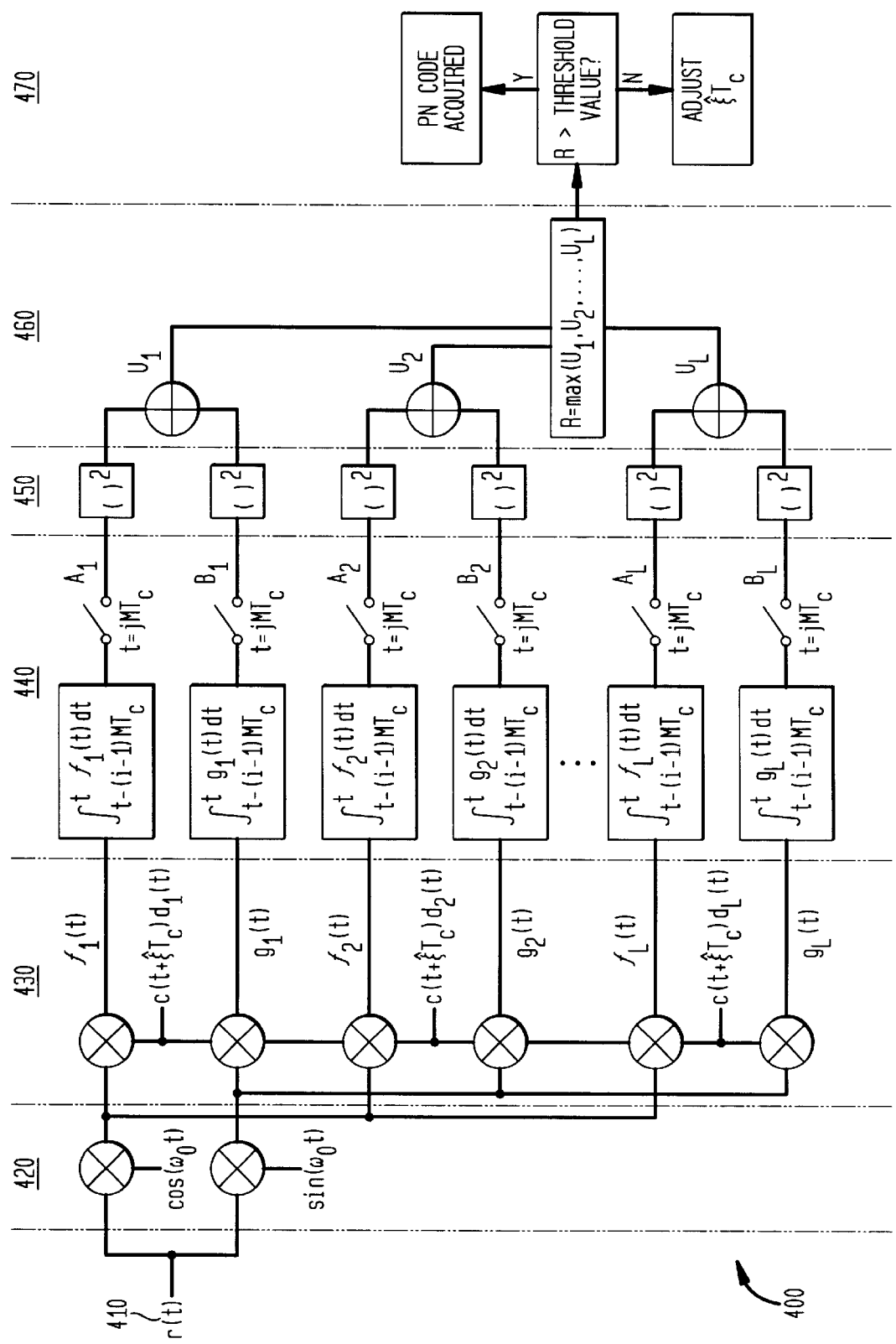
FIG. 4 is a functional circuit diagram of the present inventive partially matched filter for acquiring a transmitted PN code in the presence of BPSK modulation.

FIG. 4 shows a functional circuit diagram of a correlator 400 in accordance with an embodiment of the present invention for a received signal that is BPSK modulated. The correlator 400 includes an in-phase quadrature (I-Q) multiplication stage 420, a multiplication stage 430, an integration stage 440, a squaring stage 450, a sum and compare stage 460, and a comparator 470. Each stage of the correlator 400 is made of separate sections. Each section operates as a matched filter for a portion of a data sequence. Since only a small portion of the data signal is compared to acquire a transmitted PN-code, the present inventive correlator operates as a partially matched filter.

In operation, a received signal r(t) 410 consists of a noise component and a PN code multiplied by a data signal and a carrier frequency as shown in equation 1. For simplicity of description, an AWGN noise component is presumed for the received transmission. However, the proposed partially matched filter method may also be applied to a fading noise channel as well as other noise components. In operation, this may only require a modification of the comparator stage 470. The multiplication stage 420 performs I-Q channel frequency down conversion by multiplying the received signal r(t) 410 by $\cos(\omega_0 t)$ and $\sin(\omega_0 t)$, respectively. The I-Q down converted signals are operated on separately by each section of each stage of the correlator 400 until the sum and compare stage 460, wherein the I-Q down converted signals are combined.

The down converted signals are received by the multiplication stage 430 and are multiplied by:

$$c(t+\hat{\xi}T_c)d_i(t), \text{ for } i=1,2,\ldots,L \tag{3}$$

within the sections i=1, 2, . . . ,L. The number of sections L utilized by the multiplication stage 430, and the $d_i(t)$ component of the multiplication are discussed below.

For a case where there is Q maximum possible data transitions in an integration interval $MT_c$, the integration interval is portioned into 2Q+1 subsections. In this way, there are 2Q potential intersection edges within the integration interval $MT_c$. For a data pattern $d_i(t)$, that starts with a value of +1 at the beginning of the integration interval, the polarity of the data pattern will change at an intersection edge with a probably of 1/2. Each time an intersection edge is encountered, the probably of the data pattern changing polarity is 1/2. Consequently, there are:

$$L = C_0^{2Q} * C_1^{2Q} + \ldots + C_Q^{2Q} \tag{4}$$

data patterns possible, where:

$$C_y^x = \frac{x!}{y!(x-y)!}. \tag{5}$$

Figure 5A:
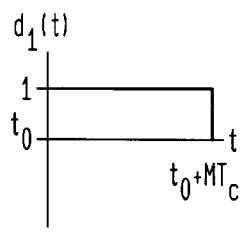
FIGS. 5A, 5B, and 5C illustrate the possible data patterns for an integration interval of three chip times of the PN code, wherein the integration interval is selected to have only one possible data transition.
Figure 5B:
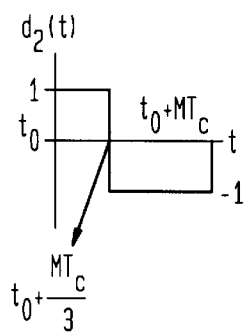
Figure 5C:
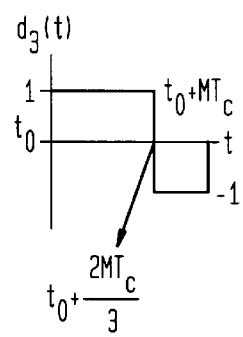

FIGS. 5A, 5B, and 5C show the possible data patterns for a case wherein the maximum possible data transitions Q within the integration interval $MT_c$ is selected as one (e.g., Q=1). As shown, for Q=1, and an integration interval $MT_c$ partitioned into 2Q+1 subsections, there are three possible data patterns.

In FIG. 5A, the data pattern makes no transitions within the integration interval $MT_c$. In FIG. 5B, the data pattern makes a transition at:

$$time = t_0 + \frac{MT_c}{3}. \qquad (6)$$

In FIG. 5C, the date pattern makes an transition at:

$$time = t_o + \frac{2MT_c}{3}. \qquad (7)$$

Returning to FIG. 4, accordingly, for Q=1, there need only be three sections (e.g., matched filters) of the correlator 400. One section for each of the data patterns $d_1(t)$, $d_2(2)$, and $d_3(t)$. Each section of the multiplication stage 430 produces separate I-Q converted signals.

The products (e.g., the separate I-Q down converted signals) of each section of the multiplier block 430 are accumulated for $MT_c$ seconds (e.g., the integration interval) by the integration stage 440. The accumulated values ("$A_i$, $B_i$ values", for i=1,2, . . . L, representing the I-Q components, respectively) are retrieved each integration interval and squared by each section of the squaring stage 450. Thereafter, the $A_i$, $B_i$ values of each section of the squaring stage 450 are summed. In other words:

$$A_i^2 + B_i^2 = U_1, \text{ for } i=1,2,\ldots,L. \qquad (8)$$

The results $U_i$ from each section are compared together by the sum and compare stage 460 to determine which is the largest value R. The largest value R is compared to a threshold value by the comparator 470 to determine if the phase of the PN code utilized by the multiplication stage 430 (e.g., the phase of the PN code at the receiver) is in phase with the transmitted PN code. In other words, R is compared to a threshold value to determine if the transmitted PN code is acquired.

In a case where R is greater than the threshold value, then the PN code is acquired. In a case where R is equal or less than the threshold value, the receiver PN code phase is adjusted and the above described process is repeated for another integration interval. This process is repeated until the transmitted PN code is acquired (e.g., the R value is greater than the threshold value). Thereafter, the acquired PN code may be used to despread the received signal as is known in the prior art.

Figure 3C:
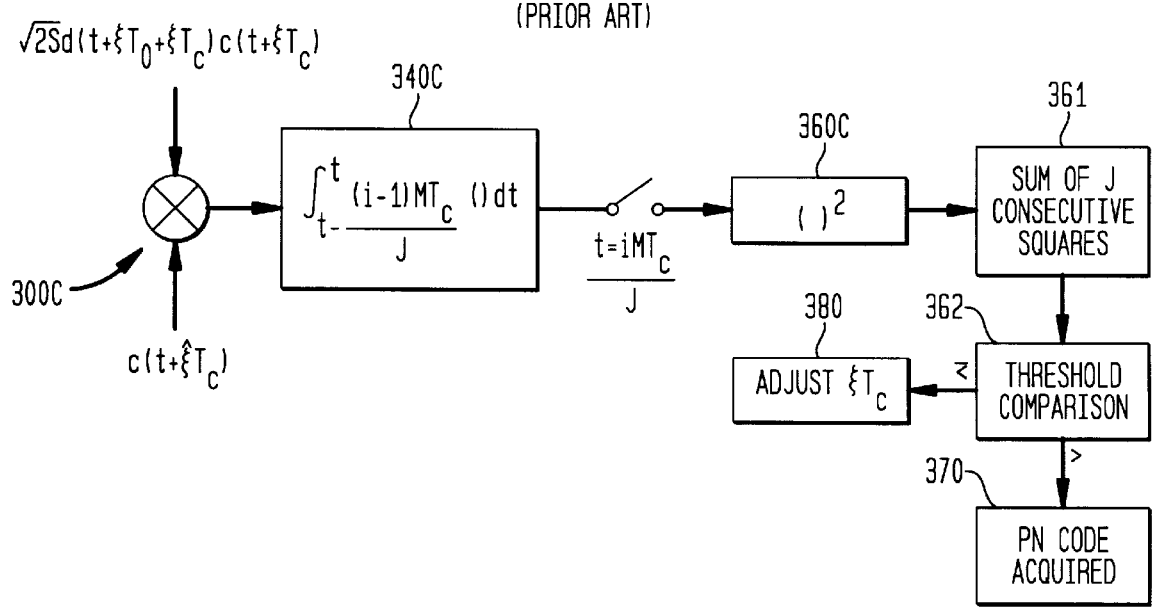
FIG. 3C is a block diagram of prior art correlator that may operate in the presence of data modulation.

For an example, take a case wherein the input signal is $\sqrt{(2s)}d_7(t)c(t)$ as shown in FIG. 3B and the PN code of the correlator is c(t) as shown in FIG. 3B. IN FIG. 4, $d_1(t)$, $d_2(t)$, and $d_3(t)$, respectively correspond to $d_{15}(t)$, $d_5(t)$, and $d_{10}(t)$ in FIG. 3B. Note that for a case wherein the signal is not BPSK modulated, the multiplication by $\cos(\omega_0 t)$ and $\sin(\omega_0 t)$ is not necessary. Accordingly, when the signal is not BPSK modulated, multiplication by block 420 would not be performed and there would not be separate I-Q down converted portions for the partially matched filter of the present invention. When the receiver PN code is synchronized with the transmitted PN code (e.g., $\zeta = \hat{\zeta}$), the first result from integrate and dump 440 and squaring block 450 has the value of $(-\sqrt{(2s)})^2 = 2s$. The second result has the value of $(11\sqrt{(2s)})_2 = 242s$. The third result has the value of $(9\sqrt{(2s)})^2 = 162s$. The maximum of these results is 242s (e.q., the output from the sum and compare stage 460) which is a greater result than the prior art method. Accordingly, the present invention is more likely to properly determine when the transmitted PN code is acquired.

Figure 1:
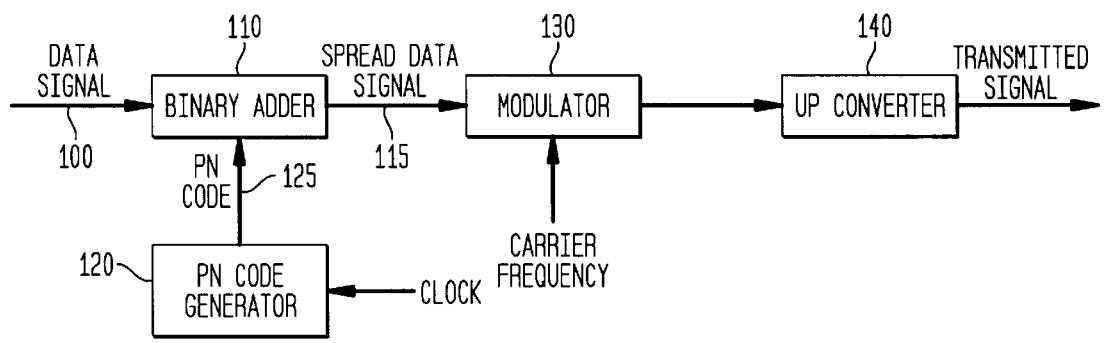
FIG. 1 is a block diagram of a prior art direct sequence spread spectrum (DSSS) transmitter.
Figure 2:
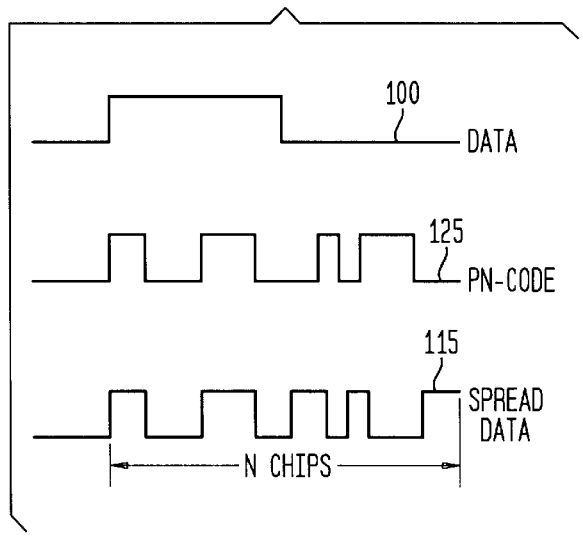
FIG. 2 is a first waveform diagram illustrating the effects of modulating a data signal with a pseudo noise (PN) code.

Inventively, the $A_i$, $B_i$ values, for i=1, 2, . . . ,L from the integration stage 440 shown in FIG. 2, are a linear combination of the subsections of the integration interval. For the example discussed above, the output signals $A_i$, $B_i$ are linear combinations of the three possible data patterns shown in FIGS. 5A–5C. Accordingly, a simplified circuit can be derived by integrating the subsections first and then performing a matrix computation, to derive the $A_i$, $B_i$ values.

Figure 6:
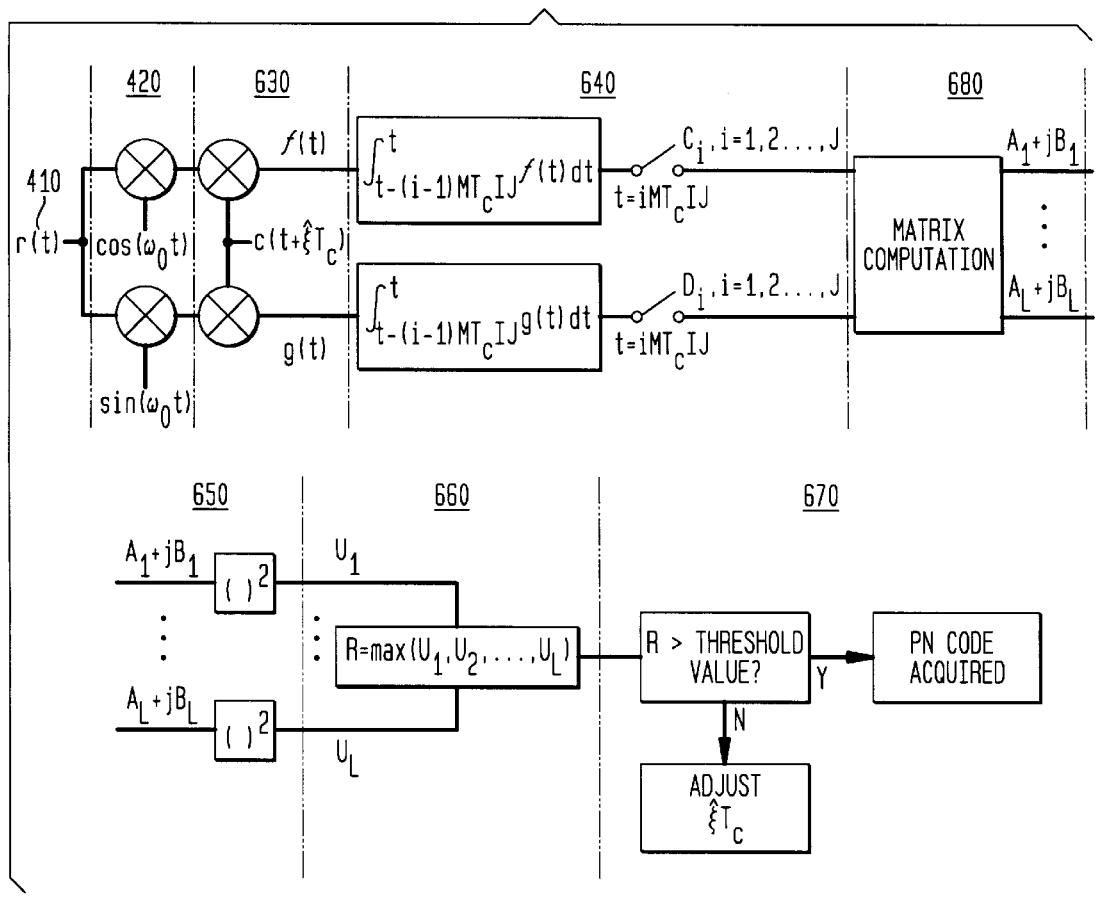
FIG. 6 is a functional circuit diagram of a partially matched filter in accordance with the present invention wherein only one matched filter is utilized and the received signal is BPSK modulated.

FIG. 6 shows a simplified correlator 600 in accordance with an embodiment of the present invention. As shown, this new structure uses only one section (e.g., one matched filter) with the integration interval changed from $MT_c$, as used in FIG. 4, to:

$$\frac{MT_c}{J}, \text{ wherein } J = 2Q + 1. \qquad (9)$$

A multiplication stage 420 performs an I-Q channel frequency down conversion as described above with reference to FIG. 4. A multiplication stage 630 then multiples the respective I-Q down converted signals by a PN code having an estimated phase. The products of the multiplication stage 630 are received by an integrator stage 640. The integrator stage 640 operates similar to the integrator stage 440 shown in FIG. 4, with the exception that the integration interval is changed to:

$$\frac{MT_c}{J}$$

as discussed previously. The integration results $C_i$, $D_i$, (the separate I-Q down converted components) for i=1,2,. . . ,J, are multiplied by a matrix W by the matrix computation stage 680. The matrix represents the possible data transitions (e.g., see FIGS. 5A, 5B, and 5C) for the integration interval $MT_c$.

The matrix computation is:

$$[C_1+jD_1, C_2+jD_2, \ldots, C_J+jD_J]W = [A_1+jB_1, A_2+jB_2, \ldots, A_L+jB_L] \qquad (10)$$

For the case where the maximum possible data transitions are Q=1, the matrix is:

$$\underline{W} = \begin{matrix} 1 & 1 & 1 \\ 1 & -1 & 1 \\ 1 & -1 & -1 \end{matrix} \qquad (11)$$

as shown, the resulting X+jY values (see equation 9) are complex numbers.

Returning to FIG. 6, the absolute values $A_i+jB_i$, for i=1, 2, . . . ,L are squared by L sections of a multiplication stage 650:

$$(A_i+jB_i)^2 = U_i, \text{ for } i=1,2,\ldots,L. \qquad (12)$$

A comparator 660 compares the $U_1$ through $U_L$ values to determine which $U_i$ value is largest.

The largest resulting $U_i$ value, for i=1, 2, . . . ,L, is then compared to a threshold value by comparator block 670 to determine if the transmitted PN code is acquired. Thereafter, if the largest $U_i$ value is equal or less than the threshold value, the phase of the receiver PN code is altered, for instance by one chip interval. The process is then repeated for another integration interval. When the PN code is acquired:

$$\max(U_i) > \text{threshold value}, \qquad (13)$$

the acquired PN code may be utilized to recover the data signal.

For instance, returning to FIG. 6, a spread signal r(t) 410 is received and transferred to the multiplication stage 420. The multiplication stage 420 performs I-Q channel frequency down conversion by multiplying the spread signal r(t) 410 by $\cos(\omega_0 t)$ and $\sin(\omega_0 t)$, respectively. The down converted signals are then received by the multiplication stage 430 and are multiplied by the acquired PN code to despread the signals.

During despreading, the portion of the demodulated signal that contains spread data is additively combined with the acquired PN code to produce a high output. Despreading the spread signal produces a high output since the spread data signal and the acquired PN code reinforce each other. Conversely, the portion of the received signal that contains the noise signal n(t), such as AWGN (see equation 1), may randomly fall in and out of phase with the PN code. Yet in general, the noise signal n(t) destructively combines with the acquired PN code to produce a small signal.

The despread signals (the I-Q portions of the signal) are then received by the integrator stage 640. The integration interval of the integrator stage 640 may illustratively then be changed to one data interval so that each discrete data element may be recovered. The results from the integrator stage 640 (the I-Q portions) are then combined for each data interval by a multiplier stage (not shown) to recover the data signal. Accordingly, since the acquisition circuit of FIG. 6 operates continuously, it has a low probability of acquisition loss.

Figure 7:
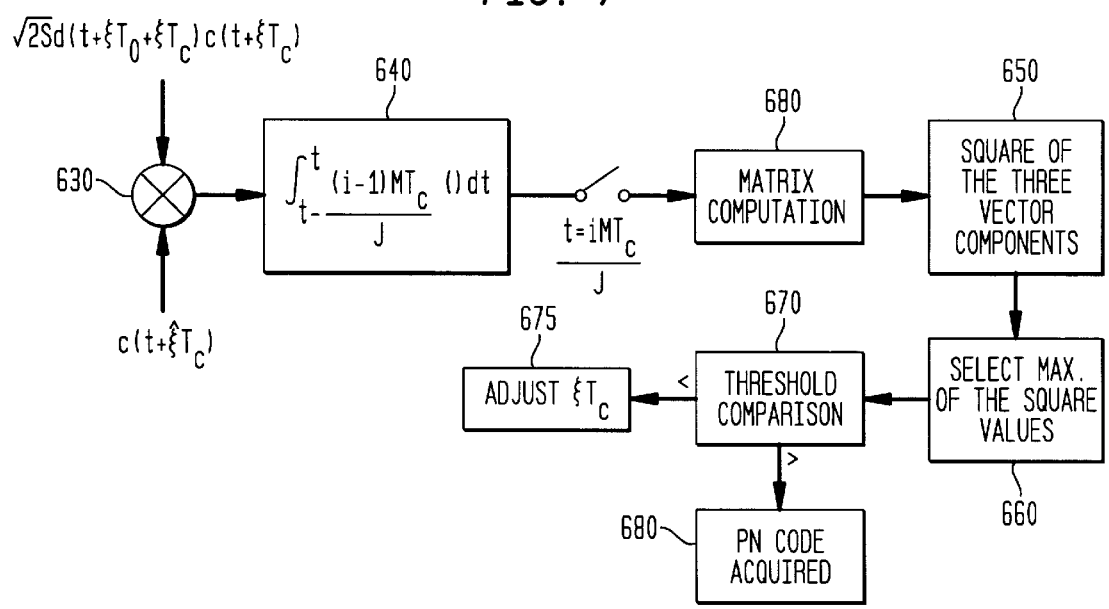
FIG. 7 is a functional circuit diagram of a partially matched filter in accordance with the present invention for acquiring a received signal that is not BPSK modulated.

FIG. 7 is a functional circuit diagram of a partially matched filter for acquiring a transmitted signal r(t) that is not BPSK modulated. This circuit corresponds to the circuit shown in FIG. 6 with the exception that I-Q multiplication stage (multiplication by $\cos(\omega_0 t)$ and $\sin(\omega_0 t)$)420 shown in FIG. 6 is not utilized in FIG. 7.

Assume that for Q=1, three consecutive subintervals results in values at the integrate and dump 640 of $x_1, x_2, x_3$. Then:

$$[x_1, x_2, x_3] \begin{matrix} 1 & 1 & 1 \\ 1 & -1 & 1 \\ 1 & -1 & -1 \end{matrix} = [x_1 + x_2 + x_3,$$

$$x_1 x_2 - x_3, x_1 + x_2 - x_3] = [Y_1, Y_2, Y_3].$$

These $Y_1, Y_2, Y_3$ values equal the integrate and dump values from block 640 and yield the same results, presuming no BPSK modulation, as the partially matched filter in FIG. 4 (e.g., without multiplication block 420), yet like FIG. 6, contains simpler circuitry requiring only one filer and one matrix operation.

Conclusion

The partially matched filter of the present invention provides a method of acquiring a transmitter PN code even when a received signal is data modulated. Consequently, the partially matched filter may be utilized in a case where no pilot channel is available. In addition, the partially matched filter may be utilized when synchronization of the receiver PN code with the transmitted PN code is lost due to fading noise. The simplified partially matched filter circuit greatly reduces the number of matched filters (e.g., sections) utilized for an integration in which many data transitions may occur (e.g., when Q becomes large).

Finally, the above discussion is intended to be merely illustrative of the present invention. Numerous alternative embodiments may be devised by those having ordinary skill in the art without departing from the spirit and scope of the following claims.

The claimed invention is:

1. A method of acquiring a transmitted pseudo noise (PN) code c(t) from a received signal r(t) that is data modulated, said transmitted PN code c(t) having a first PN code phase, the method comprising the steps of:

(a) multiplying the received signal r(t) by each of a plurality of signals, wherein each of said plurality of signals is the PN code c(t), having a second PN code phase, as modulated by one of a plurality of data signals, and wherein a portion of said received signal r(t) is utilized over an interval $MT_c$, wherein said interval $MT_c$ is selected to have a maximum of Q data signal transition and a maximum of L different data patterns, wherein $$L = C_0^{2Q} + C_1^{2Q} + \ldots + C_Q^{2Q}$$

and $$C_y^x = \frac{x!}{y!(x-y)!};$$

wherein M is integer, $T_c$ is a chip time of a pseudo noise (PN) code, x and y are positive integer and x>y;

(b) integrating the result of each multiplication to produce a plurality of integration results;

(c) squaring each of said plurality of integration results to produce a plurality of square values; and (d) comparing each one of said plurality of square values to a threshold value to determine if said first PN code phase equals said second PN code phase.

2. The method of claim 1, further comprising the steps of:

(e) changing said second PN code phase if said second PN code phase does not equal said first PN code phase; and (f) repeating steps (a) through (d).

3. The method of claim 1, wherein said received signal r(t) is binary phase shift key (BPSK) modulated, said method further comprising the steps of:

prior to step (a), multiplying the received signal r(t) by each of $\cos(\omega_0 t)$ and $\sin(\omega_0 t)$ to produce in-phase and quadrature (I-Q) down converted signals, wherein $\omega_0$ is a carrier frequency of said received signal r(t); and performing steps (a) through (d) utilizing said in-phase and quadrature (I-Q) down converted signals.

4. A method of despreading a received spread spectrum signal r(t) that is spread utilizing a pseudo noise (PN) code c(t) having a first PN code phase, the method comprising the steps of:

(a) multiplying the received signal r(t) by each of a plurality of signals, wherein each of said plurality of signals is the PN code c(t), having a second PN code phase;

(b) integrating the result of each multiplication to produce a plurality of integration results;

(c) squaring each of said plurality of integration results to produce a plurality of square values;

(d) multiplying said plurality of square values by a matrix wherein the matrix represents data patterns within an interval $Mt_c$, and wherein said interval $MT_c$ is selected to have a maximum of Q data signal transitions and a maximum of L different data patterns wherein $$L = C_0^{2Q} + C_1^{2Q} + \ldots + C_Q^{2Q}$$

and $$C_y^x = \frac{x!}{y!(x-y)!};$$

wherein M is integer, $T_c$ is a chip time of a pseudo noise (PN) code, x and y are positive integer and x>y;

(e) comparing the results of the matrix multiplication to a threshold value to determine if said PN code is acquired.

5. The method of claim 4, further comprising the steps of:
(f) utilizing said PN code c(t) with said second PN code phase to despread said received signal r(t) if said PN code is acquired.

6. The method of claim 4, further comprising the steps of:
(f) changing said second PN code phase if said PN code is not acquired; and
(g) repeating steps (a) through (e).

7. The method of claim 4, wherein said received signal r(t) is binary phase shift key (BPSK) modulated, said method further comprising the steps of:
prior to step (a), multiplying the received signal r(t) by each of $\cos(\omega_0 t)$ and $\sin(\omega_0 t)$ to produce in-phase and quadrature (I-Q) down converted signals, wherein $\omega_0$ is a carrier frequency of said received signal r(t); and
performing steps (a) through (e) utilizing said in-phase and quadrature (I-Q) down converted signals.

8. A method of acquiring a transmitted pseudo noise (PN) code from a received signal r(t) that is data modulated, wherein the received signal r(t) has the form:

$$r(t) = \sqrt{2S} d(t + \xi T_0 + \zeta T_c) c(t + \zeta T_c) = \cos(\omega_0 t + \theta) + n(t)$$

and:
S is a transmitted signal power,
$T_c$ is a chip time of a pseudo noise (PN) code,
$T_0$ is a data bit time, which is a multiple of $T_c$,
c(t) is a PN code waveform,
d(t) is a data signal,
$\omega_0$ is a carrier frequency,
θ is a waveform phase,
$\zeta T_c$ is a first PN code phase,
$\xi T_0$ is a data-bit-phase offset from the first PN code phase, and
n(t) is a noise component,
the method comprising the steps of:
(a) multiplying the received signal r(t) by $\cos(\omega_0 t)$ and $\sin(\omega_0 t)$, respectively to produce in-phase and quadrature (I-Q) down converted signals;
(b) multiplying the I-Q down converted signals by the PN code waveform c(t) having a second PN code phase to produce f(t) and g(t) respectively;
(e) integrating separate contiguous portions of f(t) and g(t);
(f) multiplying the integrated portions of f(t) and g(t) by a matrix wherein the matrix represents data patterns within an interval $MT_c$ that spans the separate contiguous portions of f(t) and g(t) and wherein the interval $MT_c$ is selected to have a maximum of Q data signal transitions and a maximum of L different data patterns, wherein:

$$L = C_0^{2Q} + C_1^{2Q} + \ldots + C_Q^{2Q}$$

and $$C_y^x = \frac{x!}{y!(x-y)!};$$

wherein M is integer, x and y are positive integer and x>y;

(g) comparing the results of the matrix multiplication to a threshold value to determine if the first PN code phase is equal to the second PN code phase.

9. The method of claim 8, wherein each row of the matrix represents a data pattern.

10. The method of claim 8, further comprising the step of:
(h) changing the second PN code phase and repeating steps (b) through (g) if the results of the matrix multiplication are less than or equal to the threshold value.

* * * * *